United States Patent [19]

Browne

[11] Patent Number: 4,922,945

[45] Date of Patent: May 8, 1990

[54] SELF-SERVICING HYDRAULIC TENSIOMETER WITH ELECTRICAL SWITCHING AND RESPONSE CAPABILITIES

[75] Inventor: Christopher L. Browne, Philomath, Oreg.

[73] Assignee: Irro-Controls Group, Corvallis, Oreg.

[21] Appl. No.: 303,913

[22] Filed: Jan. 30, 1989

Related U.S. Application Data

[63] Continuation-in-part of Ser. No. 189,575, May 3, 1988, which is a continuation-in-part of Ser. No. 46,803, May 4, 1987, abandoned.

[51] Int. Cl.⁵ .............................. A01G 25/16
[52] U.S. Cl. .................. 137/78.3; 137/624.11; 73/73; 239/63
[58] Field of Search ............ 137/624.11, 78.3; 239/63; 73/73

[56] References Cited

U.S. PATENT DOCUMENTS

| | | | |
|---|---|---|---|
| Re. 29,022 | 11/1976 | Spencer | 239/542 |
| 1,029,688 | 6/1912 | Johnson | 251/29 |
| 2,557,536 | 6/1951 | Drane et al. | 137/53 |
| 2,743,552 | 5/1956 | Hunter | 47/1 |
| 2,811,167 | 10/1957 | Bott | 137/414 |
| 2,863,698 | 12/1958 | Richards | 299/25 |
| 2,878,671 | 3/1959 | Prosser et al. | 73/73 |
| 2,893,641 | 7/1959 | Hunter | 239/64 |
| 3,165,115 | 1/1965 | Erson | 137/494 |
| 3,300,174 | 1/1967 | Urban et al. | 251/29 |
| 3,559,062 | 1/1971 | Wright | 324/157 |
| 3,570,542 | 3/1971 | Otto | 251/29 |
| 3,621,872 | 11/1971 | Fisher | 137/494 |
| 3,642,204 | 2/1972 | McCloskey | 239/63 |
| 3,747,399 | 7/1973 | Treirat | 239/63 |
| 3,806,851 | 4/1974 | McCormick | 335/205 |
| 3,814,377 | 6/1974 | Todd | 137/517 |
| 3,874,590 | 4/1975 | Gibson | 239/63 |
| 3,898,872 | 8/1975 | Skaling et al. | 73/73 |
| 3,910,300 | 10/1975 | Tal | 137/78.3 |
| 3,961,753 | 6/1976 | Sears | 239/64 |
| 4,040,436 | 8/1977 | Caldwell | 137/78.3 |
| 4,055,200 | 10/1977 | Lohoff | 239/63 |
| 4,113,180 | 9/1978 | Christy et al. | 239/542 |
| 4,182,357 | 1/1980 | Ornstein | 137/1 |
| 4,548,225 | 10/1985 | Busalacchi | 137/624.11 |
| 4,811,221 | 3/1989 | Sturman et al. | 137/624.12 |

Primary Examiner—A. Michael Chambers
Attorney, Agent, or Firm—Klarquist, Sparkman, Campbell, Leigh and Whinston

[57] ABSTRACT

A hydraulic tensiometer includes a pressure-sensitive electrical switch which acts to control an irrigation system in response to changes in matric water potential. Three chambers are defined in the tensiometer by moveable diaphragms. Two of the chambers are not in communication with the tensiometer probe, but are interconnected by a passageway. Flow through the passageway is controlled by an electrically operated valve.

7 Claims, 3 Drawing Sheets

SELF-SERVICING HYDRAULIC TENSIOMETER WITH ELECTRICAL SWITCHING AND RESPONSE CAPABILITIES

This is a continuation-in-part of application Ser. No. 189,575 filed May 3, 1988; which is a continuation-in-part of application Ser. No. 046,803, filed May 4, 1987, now abandoned.

BACKGROUND OF THE INVENTION

The present invention relates to instruments that measure soil water matric potential, and specifically to instruments known as hydraulic tensiometers. It relates also to the use of hydraulic tensiometers for the automatic, electrical control of irrigation systems.

Hydraulic tensiometers consist basically of a sealed, water-filled probe bounded at one end by a porous ceramic tip. The instruments can be permanently inserted into a soil or other growing medium to determine the need for irrigation. Depending on the matric water potential of the medium surrounding the ceramic tip, water will either be withdrawn from the tip to create a partial vacuum or negative pressure within the probe, or water will pass into the probe through the tip to increase the internal pressure. At equilibrium the pressure within the probe is equal to the matric water potential or 'suction' potential of the surrounding medium. This is generally less than atmospheric pressure except when the soil is saturated, and is a direct measure of the energy required to extract moisture from the medium. Matric water potential is one of the principal parameters of soil moisture that govern movement of water through the soil-plant-atmosphere continuum. Monitoring of matric potential is therefore an appropriate means for determining the need for irrigation.

Hydraulic tensiometers can be very sensitive indicators of matric water potential when properly maintained. Maintenance functions include the venting of undissolved gases that tend to accumulate in such instruments over the course of time. It also involves the replenishment of an associated loss of instrument fluid (U.S. Pat. Nos. 2878671 and 3898872). Such maintenance functions conventionally require manual labor for, despite prior attempts (U.S. Pat. Nos. 2863698 and 2893641), no commercially successful self-servicing tensiometers are currently available to the author's knowledge.

Hydraulic tensiometers have been developed with electrical switching capabilities, and which are responsive to changes in soil matric water potential (U.S. Pat. Nos. 3559062, 3806851, and 3910300). When used with automatic irrigation systems, however, such instruments tend to prematurely terminate irrigation. This arises from an overreaction to the first arrival of moisture at the sensor location. The result is an isolation of the ceramic tip at an artificial boundary between wet and dry soil. The consequence is excessive and frequent irrigations to the depth of the sensor only. Conversely, a poorly serviced hydraulic tensiometer with an air void will exhibit a slow and indeterminate response to the arrival of irrigation water.

Thus it can be appreciated that there exists a need for a self-servicing hydraulic tensiometer with electrical switching capabilities, and which exhibits high sensitivity during the drying phase and a lesser, but defined sensitivity during the wetting phase. A novel approach to delaying the response during wetting is to induce a hydraulic tensiometer to absorb a significantly greater and definable volume of water during wetting than that which was lost during drying. An instrument that achieves this and other objectives is the subject of this patent disclosure.

SUMMARY OF THE INVENTION

An object of the present invention is to provide a hydraulic tensiometer that is highly sensitive to changes in matric water potential of irrigated media during the drying phase, but which has a defined, selectable, and reduced sensitivity during the wetting or irrigation phase. Another object is to provide a moisture sensor that measures changes in water flux of an irrigated medium as determined by the capacity of the medium to provide the sensor surface with a given volume of water in a specified time (g. water/$cm^2$/sec). Another object is to provide a moisture sensor that, by electrical means, initiates operation of an irrigation application system upon attainment of a preselected soil matric water potential in a medium, and upon attainment of a preselected water flux, terminates the irrigation of the medium by electrical means. Yet another object is to provide a hydraulic tensiometer that, subsequent to a determination of water flux, expels under pressure and through a valve means, excess water extracted from the irrigated medium during the flux determination process. The effect of such expulsion is automatic venting of excess fluids and accumulated gases, if any, from the top of the tensiometer water column. Removal of accumulated gases serves to maintain the inherent high sensitivity of the tensiometer, and eliminates the need for manual servicing.

The body of the sensor defines first, second, and third chambers. A hydraulic (water-filled) tensiometer communicates with the first chamber. A first sensor passageway communicates with the first chamber, and a valve means is provided in the passageway for selectively preventing fluid communication between the first chamber and the atmosphere when the valve means is closed. An electrical switching means selectively responsive to pressure also communicates with the first chamber, and directly or indirectly operates a device such as an automatic irrigation system. The irrigation system controls water application to the region being sensed for moisture.

A first moveable diaphragm assembly separates the first and second chambers, and carries a stem within the second chamber. A first diaphragm biasing means urges the first diaphragm assembly and stem against a second moveable diaphragm assembly. The second moveable diaphragm assembly separates the second and third chambers. A second diaphragm biasing means urges the second moveable diaphragm assembly against a moveable member provided within the third chamber.

The body of the sensor defines a second sensor passageway that communicates the second chamber with the atmosphere through a port. The body of the sensor also defines a third sensor passageway that communicates with the second and third chambers. An electrically operated valve means is provided in the third sensor passageway to selectively prevent communication between the second and third chambers when the valve means is closed. Another port communicates the third chamber of the sensor with a source of fluid pressure such as the irrigation water supply itself. Fluid pressure in the third chamber is vented to the atmosphere through the port of the second chamber upon selective operation of the electrical valve means in the third sensor passageway. A flow restriction between the third chamber of the sensor and the source of fluid pressure prevents build-up of pressure in the second chamber while the electrical valve means is open.

Irrigation is initiated by the pressure-responsive electrical switching means when the medium dries to a pre-selected matric water potential as measured by the hydraulic tensiometer. A concurrent opening of the electrically operated valve means in the third sensor passageway permits depressurization of the third chamber, and upward displacement of the second moveable diaphragm assembly under the urging of the second diaphragm biasing means. Irrigation is terminated when a sufficient volume of water is absorbed through the porous ceramic tip of the tensiometer to permit upward travel of the first moveable diaphragm assembly and stem such that contact is re-established with the second diaphragm assembly. The driving force for the absorption of water is the first diaphragm biasing means acting upon the first moveable diaphragm assembly.

Contact of the stem of the first diaphragm assembly against the second diaphragm assembly results in an increase in pressure within the first chamber, and termination of irrigation by the pressure-responsive electrical switching means. A concurrent or subsequent closing of the electrically-operated valve means in the third sensor passageway causes the repressurization of the third chamber, and a joint displacement downwards of the second and first diaphragm assemblies. This displacement of the first diaphragm assembly into the first chamber causes a positive pressurization of the tensiometer, and the subsequent expulsion of fluids through the valve means of the first sensor passageway. It also causes a back-flushing of the porous ceramic tip, which promotes the porosity of the ceramic as well as the maintenance of an active hydraulic interface between the ceramic surface and the measured medium.

Another object of the invention is to provide a soil moisture sensor that can be selectively induced to measure water flux of the irrigated medium at any time, and to provide electrical switching outputs accordingly. Another object is to provide a soil moisture sensor that can be induced to measure soil water flux by application and release of pressure to the port of the second chamber.

Some advantages of these alternative means of initiating and terminating irrigation include the capability to insure that the irrigated medium is thoroughly saturated from time to time. This is appropriate for cultural operations such as the leaching of accumulated salts from a soil. Another advantage is that the self-servicing operations of this novel tensiometer can be remotely initiated at the frequency and discretion of the irrigation operator or programmer.

A further feature of the invention includes a moveable member in the third chamber for controlling the displacement of the second diaphragm assembly, and thereby the volume of water necessary to be recaptured by the tensiometer prior to irrigation termination through the electrical switching means. Another feature is the manual activation and de-activation of irrigation using this moveable member.

Other objects, advantages, and features of the invention will become evident from the drawings and following detailed description.

DESCRIPTION OF PREFERRED EMBODIMENT

Figure 1:
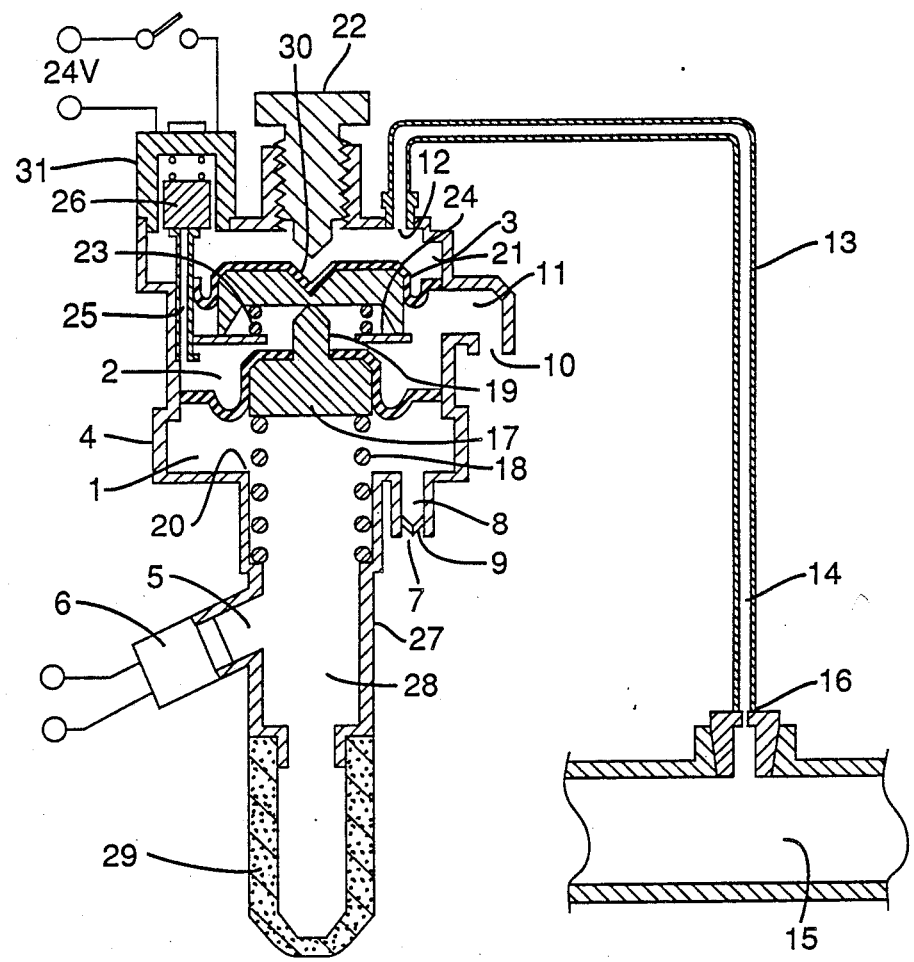
FIG. 1 is a somewhat schematic vertical sectional view of the sensor showing the second diaphragm assembly in contact with the stem of the first diaphragm assembly.

The body (4) of the sensor illustrated in FIG. 1 defines a first (1), second (2), and third chamber (3). A first port (5) communicates with the first chamber (1) and is adapted to receive an electrical switching device (6) that is selectively responsive to changes in pressure. A second port (7) communicates with the first chamber (1) through a first sensor passageway (8). A valve means (9) is provided in the first sensor passageway (8) for selectively preventing fluid communication between the first chamber (1) and the atmosphere when the valve means (9) is closed. A third port (10) communicates with the second chamber (2) through a second sensor passageway (11). A fourth port (12) communicates with the third chamber (3). A fluid line (13) provides a fluid transfer passageway (14) connecting the fourth port (12) to a source of fluid pressure (15). A flow restricting device (16) is located in the passageway (14).

A first moveable diaphragm assembly (17) separates the first (1) and second (2) chambers, and is urged upwards into the second chamber (2) by a first diaphragm biasing means (18). The first diaphragm assembly (17) carries a stem (19). Travel of the first moveable diaphragm assembly (17) is limited in one direction by contact against a surface (20) of the first chamber (1) (see FIG. 3), and in the opposite direction by contact of its stem (19) against a second moveable diaphragm assembly (21). The second moveable diaphragm assembly (21) separates the second (2) and third chambers (3). A moveable member (22) is provided within the third chamber (3) above the second diaphragm assembly (21). A second diaphragm biasing means (23) urges the second diaphragm assembly (21) against the moveable member (22). Travel of the second moveable diaphragm assembly (21) is limited in one direction by contact against a surface (24) of the second chamber (2), and in the opposite direction by contact against the moveable member (22) within the third chamber (3).

The body (4) of the sensor defines a third sensor passageway (25) connecting the second (2) and third (3) chambers. An electrically operated valve means (26) is provided in the third sensor passageway (25) for selectively preventing fluid communication between the second (2) and third (3) chambers when the valve means (26) is closed. This valve means is typically operated by a coil-and-plunger type solenoid (31).

A hydraulic tensiometer (27) which senses changes in soil water matric potential of irrigated media communicates with the first chamber (1). The tensiometer (27)

includes a sealed water-filled chamber (28) bounded at one end by a porous membrane (29) of ceramic or other material, and at another end by the first moveable diaphragm assembly (17). A pressure-responsive electrical switching means (6) communicates with a port (5) of the first chamber (1), and directly or indirectly operates an irrigation valve, pump, irrigation controller, or other device for controlling water application to the region being sensed for moisture.

Figure 2:
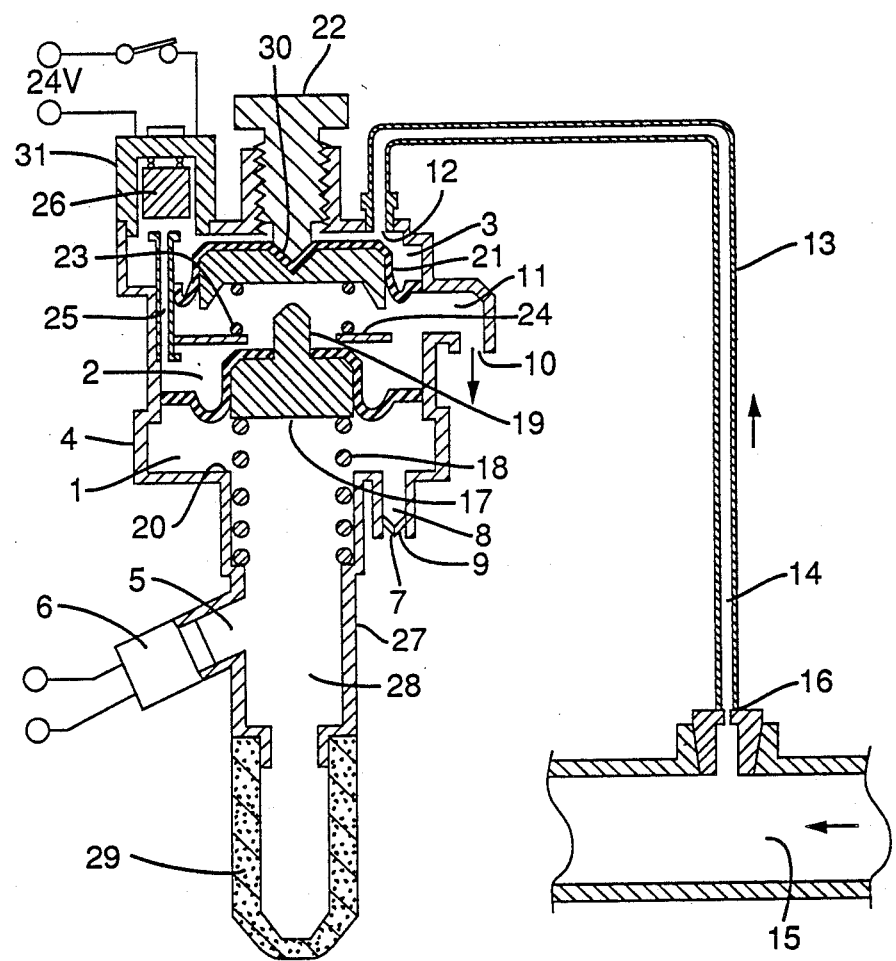
FIG. 2 is a somewhat schematic vertical sectional view of the sensor showing an open condition of the valve means in the third sensor passageway, and subsequent displacement of the second diaphragm assembly away from contact against the stem of the first diaphragm assembly.

As the irrigated medium dries, the porous membrane (29) of the tensiometer (27) permits egress of a small volume of water. This creates a negative internal pressure in the first chamber (1) that is equal to the matric water potential of the surrounding medium. When the medium dries to a preselected matric potential, irrigation is initiated by the electrical switching means (6). Subsequent to, or concurrent with the initiation of irrigation, opening of the electrically activated valve means (26) of the third sensor passageway (25) permits release of fluid pressure from the third chamber (3) through the port (10) of the second chamber (2) to the atmosphere. Upon release of this fluid pressure, the second moveable diaphragm assembly (21) is displaced upwards by the second diaphragm biasing means (23), and away from contact against the stem (19) of the first diaphragm assembly (17) as depicted in FIG. 2.

Irrigation is terminated by the electrical switching means (6) when the stem (19) of the first diaphragm assembly (17) re-establishes contact against the displaced second diaphragm assembly (21). This results in an increase in pressure in the tensiometer chamber (28) and first chamber (1). Contact between the stem (19) and the second diaphragm assembly (21) occurs only after absorption by the tensiometer (27) of a sufficient volume of water to permit the required upward displacement of first diaphragm assembly (17). The source of water available for this displacement is the medium being irrigated, and the applied irrigation water itself. The water enters the tensiometer (27) through the porous ceramic (29) in response to a pressure differential. This differential was created initially by the drying of the medium, and subsequent to the upward displacement of the second diaphragm assembly (21), by the urging of the first diaphragm biasing means (18) acting against the first diaphragm assembly (17).

The compressed force of the first diaphragm biasing means (18) is such that there is negligible movement of the first diaphragm assembly (17) during the drying phase, prior to activation of the electrical switching means (6). This ensures high sensitivity of the tensiometer (27) during drying. It also ensures that subsequent to the displacement of the second diaphragm assembly (21), as illustrated in FIG. 2, a negative pressure is established in the first chamber (1) that is of sufficient magnitude to activate the electrical switching means (6). It also ensures the establishment of a pressure differential across the ceramic membrane (29) that is sufficient to withdraw water from the surrounding medium. Furthermore, it ensures sufficient travel of the stem (19) and first diaphragm assembly (17) to permit re-establishment of contact against the second diaphragm assembly (21) once the necessary volume of water has been absorbed by the tensiometer (27).

Subsequent to, or concurrent with termination of irrigation, a closing of the electrically-operated valve means (26) of the third sensor passageway (25) causes a re-establishment of fluid pressure within the third chamber (3). This results, in sequence, the following events: (1) downward travel of the second moveable diaphragm assembly (21) to its point of contact against a surface (24) of the second chamber (2); (2) a corresponding downward travel of the first moveable diaphragm assembly (17) as a consequence of the contact between its stem (19) and the second moveable diaphragm assembly (21); (3) a positive pressurization of the fluid contents of the first chamber (1) due to the incursion of the first moveable diaphragm assembly (17); (4) an expulsion to the atmosphere of excess fluids and accumulated gases, if any, through the valve means (9) provided in the first sensor passageway (8); and (5) a back-flushing of the porous ceramic membrane (29) by an outflow of fluid from the tensiometer chamber (28) under pressure.

Other advantages of this new hydraulic tensiometer include the ability to initiate or terminate irrigation independently of soil matric water potential measurements. One way to achieve this is by selectively opening or closing the valve means (26) in the third sensor passageway (25). Opening the valve means (26) results in the upward displacement of the second diaphragm assembly (21) as shown in FIG. 2, and the establishment of a negative pressure in the first chamber (1). The extent of this negative pressure is determined by the force of the first diaphragm biasing means (18) acting upon the first diaphragm assembly (17) as previously discussed. In the preferred embodiment, the resultant negative pressure in the first chamber (1) is sufficient to initiate irrigation by the pressure-responsive electrical switching means (6).

Following initiation of irrigation in the above manner, the termination of irrigation can be designated singularly to the pressure-responsive electrical switching means (6). In such case, irrigation would be terminated upon extraction by the tensiometer (27) of a defined volume of water from the irrigated medium. This volume is determined by the positioning of the moveable member (22), and the subsequent travel and displacement of the diaphragm assemblies (21) and (17), respectively.

Alternatively, irrigation could be terminated by the closing of the previously opened valve means (26). Such closing would result in the return of the second diaphragm assembly (21) to its neutral position as illustrated in FIG. 1. Shut-off of irrigation would then again be effected by the pressure-responsive electrical switching means (6). If water had been drawn into the tensiometer (27) from the irrigated medium during the time elapsed between opening and closing of the aforementioned valve means (26), then this water would be expelled from the first chamber (1) through the valve means (9) of the first sensor passageway (8) at the point of irrigation shut-off.

Figure 3:
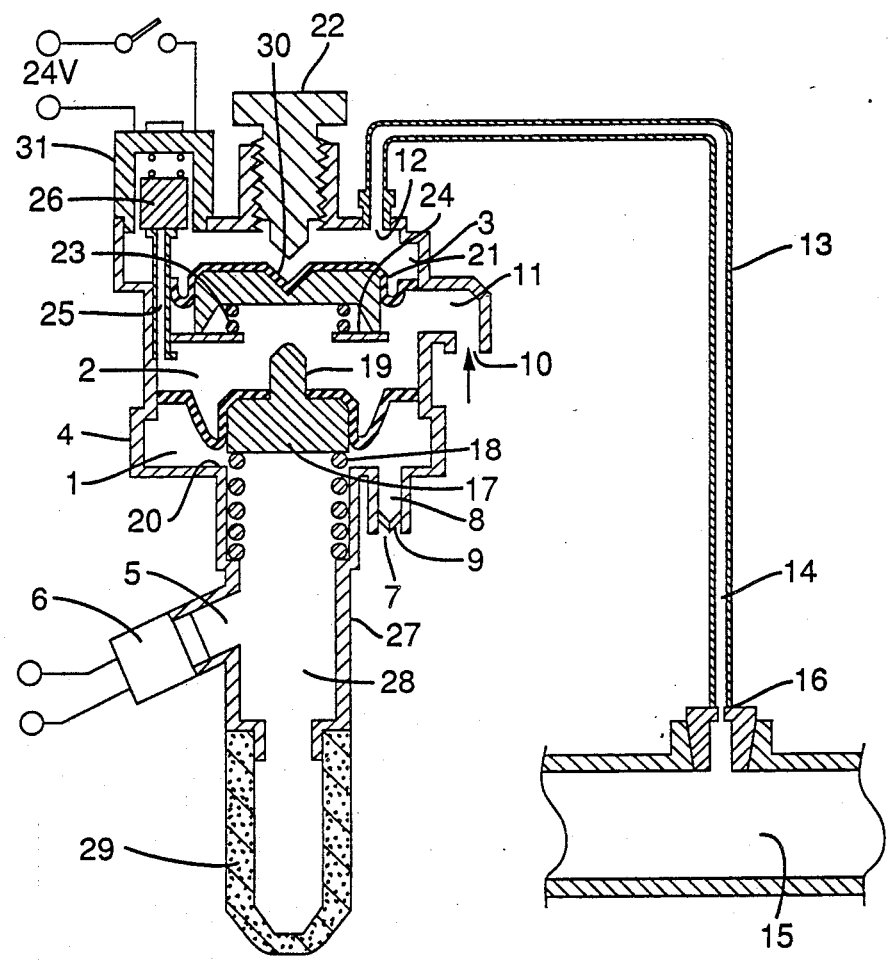
FIG. 3 is a somewhat schematic vertical sectional view of the sensor showing displacement of the first diaphragm assembly away from contact against the second diaphragm assembly following application of backpressure to the port of the second chamber.

Yet another method of initiating irrigation involves the momentary application of back-pressure through the outlet port (10) that communicates with the second chamber (2) of the sensor. The effect of such back-pressure is to displace the first diaphragm assembly (17) downwards into the first chamber (1) as illustrated in FIG. 3. This displacement is accompanied by a venting of fluids through the valve means (9) provided in the first sensor passageway (8). Irrigation is then initiated by the release of the back-pressure, and subsequent establishment of a negative pressure in the tensiometer (27) and first chamber (1). The volume of water that must be absorbed by the tensiometer (27) in order to terminate irrigation is increased by this method of activation. On-going irrigation can also be interrupted by the application of continuous pressure to port (10) of the second chamber (2).

Automatic operation of this preferred embodiment of the invention entails the communication of the third chamber (3) of the sensor to a source of fluid pressure (15). In the absence of such fluid pressure, however, the sensor may be manually operated by the threaded moveable member (22) of the third chamber (3). When fully rotated and downwardly advanced against the upper surface (30) of the second diaphragm assembly (21), the moveable member (22) maintains the second moveable diaphragm assembly (21) against the travel-limiting surface (24) of the second chamber (2). Upward rotation of the threaded moveable member (22) permits upward displacement of the second moveable diaphragm assembly (21) by the second diaphragm biasing means (23), and initiation of irrigation by the pressure-responsive electrical switching means (6). This is a response to the establishment of a negative pressure in the first chamber (1) following loss of contact between the first (17) and second (21) diaphragm assemblies. A subsequent downward and complete rotation of the moveable member (22) would cause termination of irrigation and venting of excess fluids from the first chamber (1) through valve means (9) as a result of the joint displacement of both the second and first moveable diaphragm assemblies (21) and (17), respectively.

Having illustrated and described the principles of my invention, it should be apparent to those persons skilled in the art that such invention may be modified in arrangement and detail without departing from such principles. I thus claim as my invention all such modifications as come within the true spirit and scope of the following claims.

I claim:

1. A moisture sensor for measuring soil water matric potential comprising:
    a sensor body defining first and second chambers, a first passageway communicating with the first chamber, and a second passageway communicating with the second chamber;
    an electrical switching device that is selectively responsive to changes in pressure inside the first chamber and that allows a flow control device to provide a flow of irrigation water when the pressure inside the first chamber is below a predetermined level;
    a valve means in the first passageway for selectively preventing fluid communication between the first chamber and the atmosphere via the first passageway when the valve means is closed;
    a first moveable diaphragm assembly separating the first and second chambers;
    a first diaphragm biasing means for urging the first moveable diaphragm assembly toward the second chamber;
    means for limiting the travel of the first moveable diaphragm assembly in the direction of both the first and second chambers; and
    a sealed, water-filled tensiometer probe communicating with the first chamber and bounded at one end by a porous membrane of ceramic or other material through which water may pass in response to a differential water pressure such that a decrease in the moisture level of soil outside the probe causes a lowering of the pressure inside the first chamber;
    the first moveable diaphragm assembly being moveable in the direction opposite to the urging of the first diaphragm biasing means when pressure in the second chamber exceeds pressure in the first chamber by an amount sufficient to overcome the force exerted by the biasing means.

2. The sensor of claim 1 wherein the second passageway provides an outlet to the atmosphere.

3. The sensor of claim 1 further comprising means for selectively applying fluid pressure to the second chamber via the second passageway.

4. A moisture sensor for measuring soil water matric potential comprising:
    a sensor body defining first, second, and third chambers, a first passageway communicating with the first chamber, a second passageway communicating with the second chamber, a third passageway connecting the second and third chambers, and a port communicating with the third chamber;
    an electrical switching means that is selectively responsive to changes in pressure inside the first chamber and that allows a flow control device to provide a flow of irrigation water when the pressure inside the first chamber is below a predetermined level;
    a valve means in the first passageway for selectively preventing fluid communication between the first chamber and the atmosphere via the first passageway when the valve means is closed, the valve means being automatically operable to allow fluid to flow from the first chamber through the first passageway when pressure in the first chamber exceeds a predetermined level;
    a first moveable diaphragm assembly separating the first and second chambers;
    means for limiting travel of the first diaphragm assembly in the direction of the first chamber;
    a second moveable diaphragm assembly separating the second and third chambers, the first and second diaphragm members being adapted to contact and travel with each other or to move separately depending on the relative pressures inside the chambers;
    a first diaphragm biasing means urging the first moveable assembly against the second moveable diaphragm assembly;
    a second diaphragm biasing means urging the second moveable assembly toward the third chamber;
    means for limiting travel of the second moveable diaphragm assembly in the direction of the third chamber;
    an override valve means in the third passageway for selectively preventing fluid communication between the second and third chambers via the third passageway, the overrride valve means being operable, without regard to the moisture level of the soil, to open the third passageway which allows pressure in the third chamber to be vented so that the first and second diaphragm assemblies move away from the first chamber so that pressure in the first chamber drops so that the electrical switching means allows the flow control device to provide a flow of irrigation water; and
    a sealed, water-filled tensiometer probe communicating with the first chamber and bounded at one end by a porous membrane of ceramic or other material through which water may pass in response to a differential in water pressure such that a decrease in the moisture level of soil outside the probe causes a lowering of the pressure inside the first chamber.

5. The sensor of claim 4 wherein the means for limiting travel of the second moveable diaphragm assembly is a moveable member within the third chamber.

6. The sensor of claim 5 wherein the valve means in the third passageway is operated by a solenoid.

7. An automatic irrigation control system comprising:
the moisture sensor of claim 6 inserted within an irrigated medium;
a pressurized supply of irrigation water;
a fluid line communicating the port of the third chamber to the pressurized irrigation supply;
an electrically operated irrigation valve for selectively controlling application of the irrigation water to the medium being sensed for moisture;
a pair of electrical conductors leading from a current source such as a 24 volt alternating current to the electrically operated irrigation valve;
a second pair of electrical conductors connected in parallel to the same current source as the irrigation valve, and leading to the solenoid of the moisture sensor;
a pressure-responsive electrical switching device of the moisture sensor interposed between the current source and both the irrigation valve and solenoid so as to create a closed circuit when the water pressure in the tensiometer probe declines to a preselected value, and an open circuit when the water pressure exceeds the preselected value.

* * * * *